United States Patent [19] [11] 4,034,470
Patton et al. [45] July 12, 1977

[54] METHOD FOR FABRICATING MULTI-CONDUCTOR TAP CONNECTOR

[75] Inventors: George Allen Patton, Pfafftown; John James Tucci, Winston-Salem, both of N.C.

[73] Assignee: AMP Incorporated, Harrisburg, Pa.

[21] Appl. No.: 667,044

[22] Filed: Mar. 15, 1976

Related U.S. Application Data

[62] Division of Ser. No. 514,148, Oct. 11, 1974, Pat. No. 3,963,300.

[51] Int. Cl.² ........................................ H02G 15/00
[52] U.S. Cl. .................................... 29/629; 29/628
[58] Field of Search .................. 29/628, 630 R, 629; 339/97 L, 99 R, 99 L, 153, 154, 155, 156, 157, 176 MF, 176 M

[56] References Cited

U.S. PATENT DOCUMENTS

| | | | |
|---|---|---|---|
| 3,510,825 | 5/1970 | Quackenbush | 339/29 R |
| 3,705,378 | 12/1972 | Elkins | 339/156 R |
| 3,727,168 | 4/1973 | Henschen et al. | 339/17 F |
| 3,760,335 | 9/1973 | Roberts | 339/99 R |

OTHER PUBLICATIONS

Balde, Terminating Flat Cable on Two-Row Connector, Western Electric Technical Digest No. 35, p. 1, 7/1974.

Bossi, Flat Cable Termination Techniques for Communications Connectors, Proceedings of the Technical Program, National Electronic Packaging and Production Conference, pp. 209–212, 2/1973.

*Primary Examiner*—James R. Duzan
*Attorney, Agent, or Firm*—Robert W. Pitts; William J. Keating; Frederick W. Raring

[57] ABSTRACT

A simple, compact multi-conductor tap-connector device incorporates at least three standard multi-contact individual connectors with the corresponding terminals in all of the connectors attached only by short wires running directly between the terminals. Various configurations of mating connectors can be fabricated by the same operations. The interconnecting wires form a unique latticework pattern which permits assembly of the device without the need for excess wire and gives the tap-connector device a degree of structural rigidity. Two forms of specialized apparatus suitable for inserting wires into terminal slots to establish electrical contact are used in assembly of the device.

8 Claims, 10 Drawing Figures

METHOD FOR FABRICATING MULTI-CONDUCTOR TAP CONNECTOR

This is a division of application Ser. No. 514,148 filed Oct. 11, 1974, now Pat. No. 3,963,300.

BACKGROUND OF THE INVENTION

This invention relates to the close interconnection of electrical housings by discrete electrical conductors which supply both the structural framework and the electrical connections for the resulting combination. The individual housings may contain either active or passive electrical components. Interconnection of corresponding elements or terminal positions on the several housings is accomplished with this invention. This invention is especially useful with devices containing numerous aligned electrical contact points.

One of the particularly attractive uses of this invention relates to the fabrication of connector assemblies for making tap connections with the conductors in a multi-conductor cable. A multi-contact connector of the type disclosed and claimed in U.S. Pat. No. 3,760,335 is utilized in making these tap connections. This connector contains a plurality of terminals located in two parallel rows and is designed to facilitate mass application of wires to the terminals.

Three or more of these individual connectors are joined by conductors to form this tap-connector device. U.S. Pat. No. 3,866,292 and U.S. Pat. No. 3,866,295 disclose two connector assemblies incorporating features of the three-connector assembly disclosed herein. The apparatus disclosed and claimed in those applications as well as that disclosed and claimed in U.S. Pat. No. 3,816,897 are efficient means by which these connector assemblies can be fabricated. U.S. Pat. No. 3,824,530 discloses an operation which permits fabrication of these assemblies using continuous electrical wires.

The tap-connector device or bridging adapter disclosed herein can be used with multi-conductor cable, such as 25 pair jacketed switchboard cable used extensively in telephone equipment. Such cable is used, for instance, on customer premises for connection to 5 button telephones and call directors. A branch connection to a second location can be made at a location near the principal telephone by using such a tap-connector device. It would thus become unnecessary to run an additional length of cable back to the principal terminal location. For such a use, two individual connectors would be installed at some point in the cable and the tap-connector device would be employed with these connectorized cable ends.

The individual electrical connectors used as components of this invention are particularly well adapted for connectorization of such cable. The technique of inserting individual conductors into a wire receiving terminal slot so that the insulation is displaced and electrical contact established is used with this connector. The connector is therefore especially adapted for either on-the-spot or in-plant installation. The tap-connector device which is the subject of the invention can then be readily employed with newly connectorized cable ends or with standard cable lengths. Numerous combinations of mating connectors can be employed on the cable ends, the tap-connector device, and the newly added branch or tap. One of the advantages of this invention is that it can be easily supplied in any one of these imaginable configurations. In addition to being used singly to establish one tap, a plurality of these tap-connectors could be grouped together to provide multiple branches from a single cable at a given location. Indeed, a quite complex interconnection system could be constructed using only tap-connectors of this type.

It is not difficult to visualize the advantages to be gained by joining three multi-contact connectors to form a tap connection for multi-conductor cable. The difficulty lies in the fabrication of such a device. Corresponding terminals must be connected by conductors in such a manner as to leave the mating ends of the connectors free. One method is to employ discrete wires running directly between wire-receiving portions of terminals in each pair of connectors. The wires may either be inserted into wire-receiving terminals in some manner or a conventional soldering technique may be used. It would be difficult to provide both ease of assembly and a device of the minimum dimensions by employing such a technique. This difficulty is even more evident when physical considerations necessitated by standard electrical connectors are examined. If parallel rows of electrical terminals are employed, wires used to connect corresponding terminals must at some point cross each other, thus complicating the insertion or soldering operations. A chain of several connectors joined by continuous wires could be constructed using a technique similar to that disclosed in the U.S. Pat. No. 3,824,530. These terminals are affixed to wires intermediate their ends so that terminals in more than two connectors could be affixed to the same continuous wire. Even with that technique, however, it is still difficult to attain both ease of assembly and minimum dimensions, since connectors must be located at the same position along two groups of wires and some slack must be allowed for completion of the insertion operation.

The present invention provides for both ease of assembly and minimum dimensions. The basic tap-connector device disclosed herein incorporates three-multi-contact connectors closely grouped together in a T-shaped cluster with individual, continuous wires joining corresponding terminals of the three connectors. The three-connector package is compact and interlacing wires following relatively direct paths between connectors. The wires are so short that there is virtually no movement of any one connector with respect to the other two or with respect to the entire package. The wires are almost wholly contained within the center portion bounded by adjacent sides of the three connectors. The mating faces of the individual connectors face outward from the center portion for easy connection with mating connectors mounted on multi-conductor cable. This close spacing is achieved by first using assembly apparatus capable of affixing wires to corresponding terminals in any two connectors when the connectors are placed directly opposite each other and close together. The wire-receiving portions of terminals in both connectors are placed adjacent to each other and only that space necessary for convenient travel of the wires between terminals remains. After both rows of terminals are joined all of the wires are made to extend from one side of the two-connector assembly. A third connector is then attached to these wires to form the base of the T. As the wires remain parallel throughout this operation, little difficulty is encountered in maintaining the proper wiring pattern.

It is an object of this invention to provide a compact, easily assembled tap-connector for multi-conductor cable. A further object is to allow use of a standard multi-contact connector, of the type already in use with multi-conductor cable, as the principal component of such a tap-connector. A third object is to provide a basic tap-connector design which can be utilized in several different configurations which employ different combinations of mateable connectors. A still further object is to employ a tap-connector design in which each of the possible alternate configurations may be assembled with the same set of assembly apparatus and with essentially the same set of operations for all configurations. One more object is to provide a means of fabricating a tap-connector using standard connectors and the minimum of interconnecting wire while employing relatively simple techniques for affixing the wire to the terminals in each connector.

These and other objects of the invention are achieved in the embodiments thereof which are briefly described in the foregoing abstract, which are described in detail below and which are shown in the accompanying drawing in which:

FIG. 9 is a sectional view showing a significant step for the connection of two identical connectors.

Figure 1:
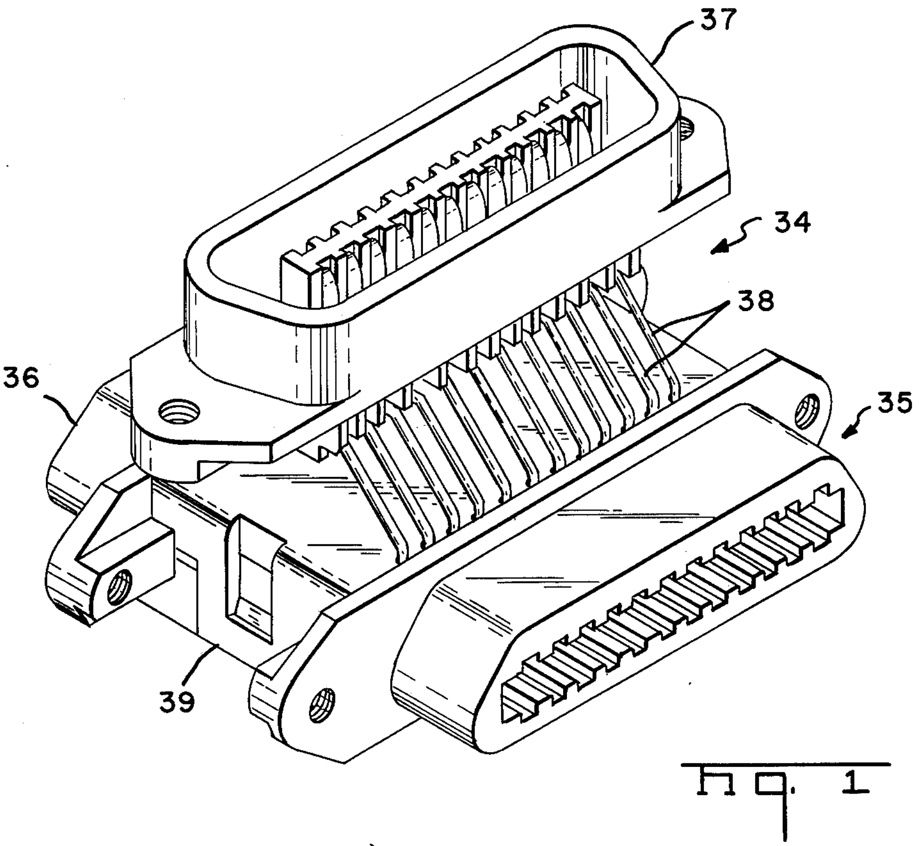
FIG. 1 is a perspective view of one configuration of the basic tap-connector which is the subject of this invention.

FIG. 1 shows one configuration of the tap-connector or bridging adapter 34, disclosed and claimed herein. Three multi-contact electrical connectors, 35, 36, and 37 are shown in their respective positions in the assembled device. This figure is a fairly accurate representation of the dimensions of the assembled device. The wires 38 extending from connector 35 to 37 as shown accurately represent the path and length of the wires traveling between corresponding terminals in two connectors. The embodiment shown in FIG. 1 has a strain relief 39 between connectors 35 and 36. The strain relief 39 covers the wires extending between connectors 35, and 36, but those wires also extend rather directly between corresponding terminals.

Figure 2:
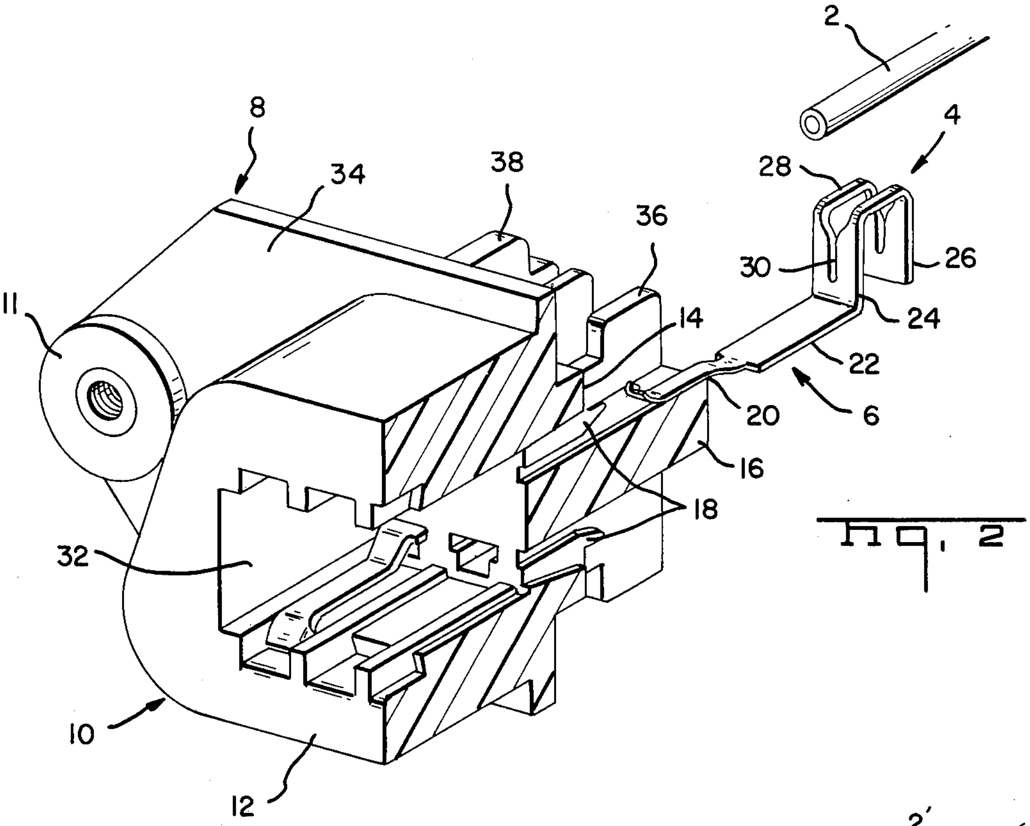
FIG. 2 is a fragmentary perspective view of the female connector utilized as a principal component of the tap connector.
Figure 3:
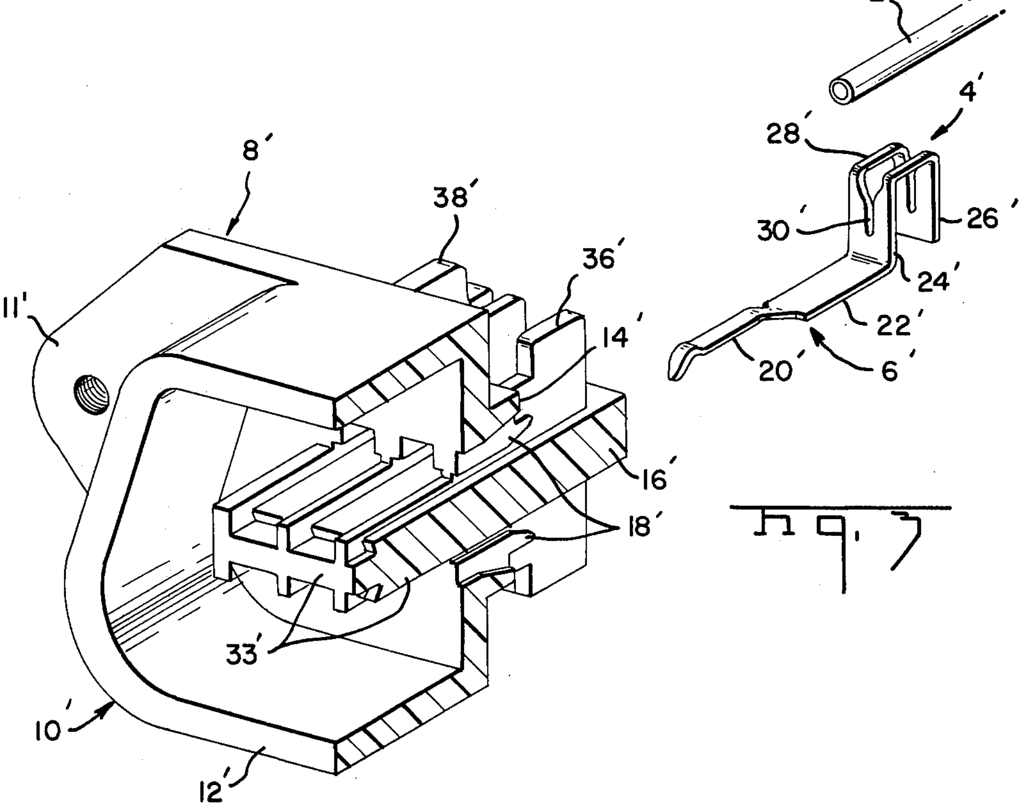
FIG. 3 is a fragmentary perspective view of the mating male connector which can also be used.

While all of the individual connectors used as components of tap-connectors such as 34 are of the same type, they need not be identical. It can be seen that connector 35 is not identical with connector 37. Connector 35 is a female connector similar to that shown in FIG. 2 while connector 37 is a male connector such as that shown in FIG. 3. Connectors of the type shown in FIGS. 2 and 3 are described fully in U.S. Pat. No. 3,760,335. In accordance with the teachings of that patent, FIG. 2 shows wires 2 connected to the wire-receiving portions 4 of electrical contact terminals 6 which are contained in the housing 10 of the connector 8. The housing has a mating face or side 12 and a rearward face or side 14. A central rib 16 extends from the rearward side or face and a plurality of side-by-side contact receiving cavities 18 extend through the housing on the upper and lower sides of the rib. Each cavity contains an individual terminal 6 and each terminal has a forward contact portion 20 an intermediate shank 22, and the previously identified wire receiving portion 4 which comprises two plate-like members 24, 26 which are connnected at their upper ends by strap sections 28. The wire 2 is moved laterally of its axis into the gap between the strap members 28 and into slots 30 in the plate sections, the width of these slots being such that the insulation of the wire is penetrated and electrical contact is established with the conducting core. When the terminals are mounted in the cavities, the contact portions extend forwardly and into a trough-like recess 32 in the mating face 12 which is adapted to receive a complementary male connector.

Adjacent terminals in the two rows are separated from each other by barriers 36 and the end barriers 38 extend somewhat beyond the other barriers 36 as shown. The housing 10 is provided with a radially extending flange 34 by means of which it may be mounted in a panel or the like.

Those parts in the male connector 8′ shown in FIG. 3 which are substantially identical to parts in the female connector 8 in FIG. 2 have been identified with primed reference numerals. It can be seen that the rearward faces or sides 14 and 14′ of the two connectors are substantially identical while the mating sides 12 and 12′ are not. Since these connectors are not hermaphroditic this dissimilarity is to be expected. The lengthwise flange 11 or 11′ is a convenient reference plane where the similar rearward sides meet the diverse mating side in each individual connector.

In the female connector 8 the forward contact portions 20 of terminals 6 would face each other along opposite walls of the trough-like recess 32. The male connector 8′ correspond to the forward contact portions 20′ which are mounted on opposite faces of the centrally located lengthwise ridge 33′. When connectors 8 and 8′ are mated, ridge 33′ is inserted into the trough-like recess 32. The terminals on one wall of recess 32 will then come into contact with terminals along one face of ridge 33′. The trapezoidal shape of the mating portions of housings 10 and 10′ allows male and female connectors such as 8 and 8′ to be mounted in only one orientation. Each row and each terminal thereby occupies a distinct position and a contact can be made only with a terminal occupying a corresponding position in a connector of the opposite sex. Of course, this must be the case if correct interconnection of circuits is to be assured.

Figure 4:
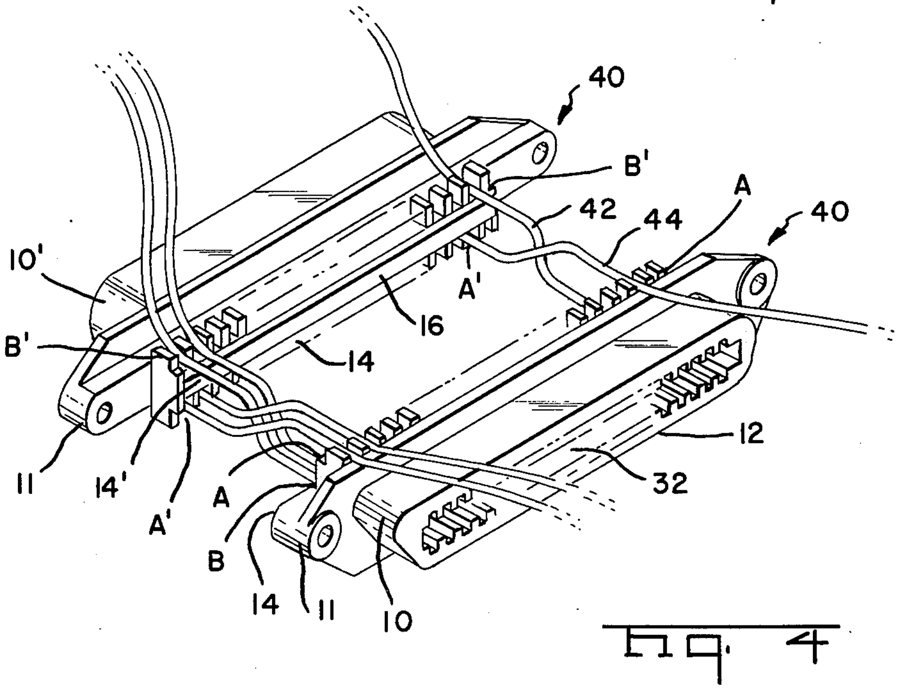
FIG. 4 is a perspective view showing the wiring necessary for joining two connectors of the same sex.
Figure 7:
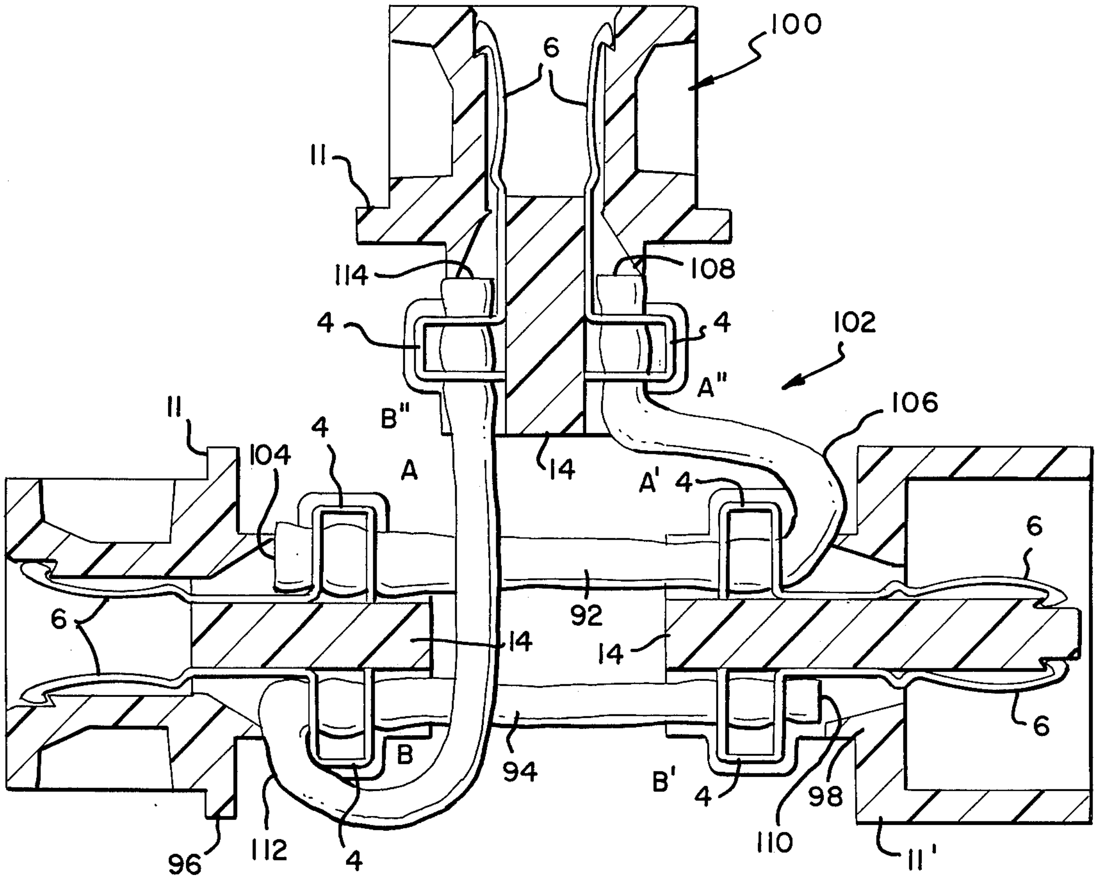
FIG. 7 is a sectional view of another configuration in which different locations of respective connectors necessitate a different wiring arrangement.

In the present invention the individual connectors forming compounds of the tap-connector are not joined by their mating sides. Corresponding unique terminals in separate connectors are instead joined by wires running between the wire-receiving portions 4 and 4′ located along the rearward sides 14 or 14′ of the connectors. When rearward sides of mating terminals are placed adjacent to each other, corresponding terminals are directly across from each other and the wires connecting them would extend in a straight line. Wires 92 and 94 connecting corresponding terminals in female connector 96 and male connector 98 in FIG. 7 is the only illustration of that arrangement shown. When connectors of the same sex are placed back-to-back the situation illustrated by FIG. 4 results. The two parallel rows of terminals in connector 40′ have been identified as A′ and B′ while the rows in connector 40 have been identified as A and B. Again, each of the two separate rows in any one connector occupies a unique position because of the trapezoidal mating housings 10 and 10′. The respective terminals in Row A in female connector 40 do not occupy the same position as terminals in row B′ of female connector 40′ but correspond with those in row A′. The same can be said of row B (hidden on connector 40) and row B′ on connector 40′. This results in a necessity for wires 42 and 44, each joining corresponding terminals, to cross as shown. Upon reflection it becomes apparent that it would be impossible to align corresponding terminals in connectors of the same sex simultaneously along the axis of the parallel rows and along the direction perpendicular to that axis. The offset of corresponding rows depicted in FIG. 4 accordingly offers the most convenient solution. Of course, when two connectors are joined in this manner, discrete rows (A and B′) in the two connectors will be located on the same side of the resulting combination as shown in FIG. 4. This fact forms one of the keys to the assembly of the compact tap-connector here disclosed. In FIG. 4, the terminals in rows A and B′ are connected intermediate the ends of wires 44 and 42 respectively. A third connector can then be added since a wire for each set of corresponding terminals, that is each row, is now available. A discussion of the features of apparatus suited to assemble the individual connectors in the compact arrangement envisioned, will follow a discussion of the various configurations possible for this invention.

Figure 5:
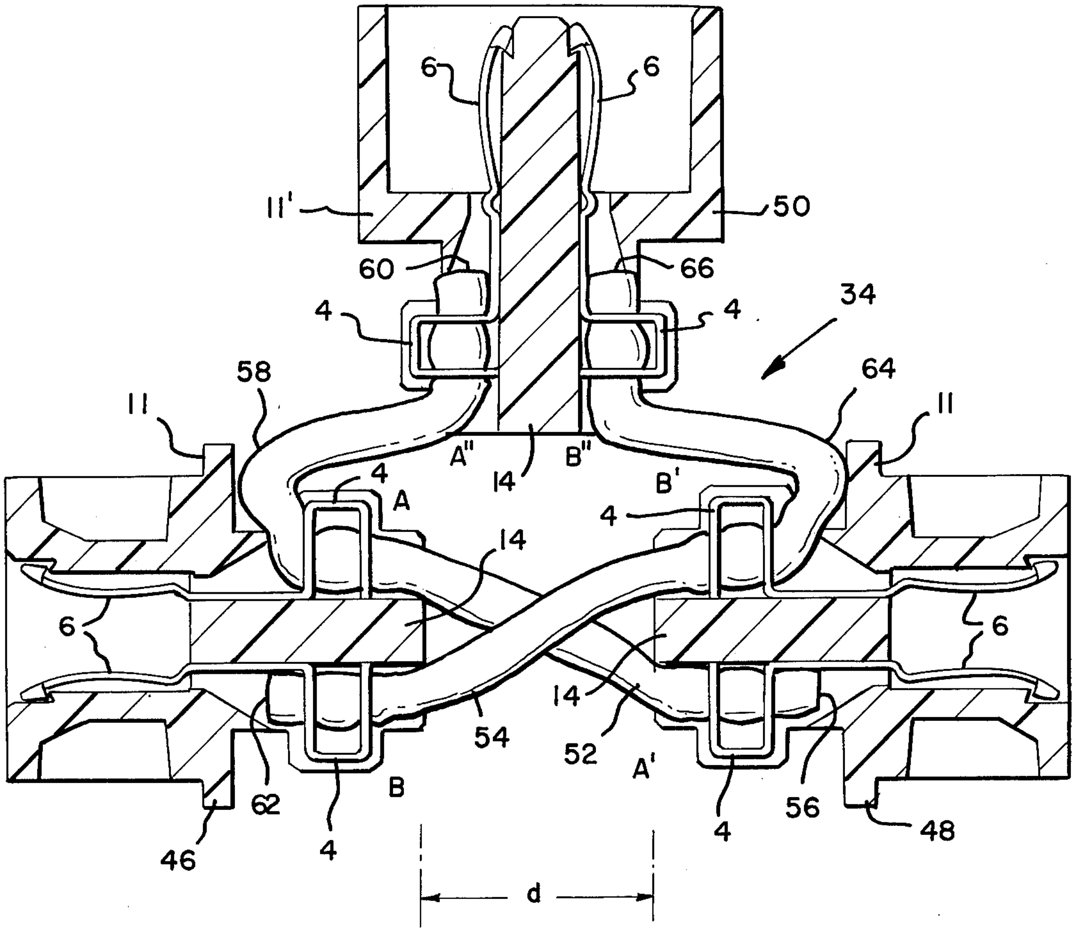
FIG. 5 is a sectional view of a tap-connector employing two female and one male connector showing the wiring pattern necessitated by such an arrangement.

The simplest lacing pattern for interconnecting three connectors occurs when two identical and one mating connectors are used a shown in FIG. 5. FIG. 5 is a view along a section through any set of corresponding terminals in three connectors. There are two female connectors 46 and 48 which are positioned as in FIG. 4 and a male connector 50 occupies a third position to form the T. The configuration in FIG. 5 is the same as that shown in FIG. 1. Corresponding rows in each of the connectors have been identified as either A, A′, A″, or B, B′, B″. While the wires 52 and 54 must cross in traveling between female connectors 46 and 48, the portions of the wires joining male connector 50 with the two female connectors do not cross. It should also be noted that wire 52 connects terminals in row A of connector 46 with terminals in row A″ of connector 50 while wire 54 connects terminals in row B′ of connector 48 with terminals in row B″ of connector 50. In other words connector 50 receives one row of wires from one connector, 46, and another row of wires from the other connector 48. This three-connector assembly cannot then be said to be a chain of three connectors. The pattern formed by the connecting wires is a latticework and not a chain since the intermediate ends 58, 64 of the wires are located in separate connectors.

FIG. 5 also clearly shows the relative lengths of the wires. Each wire follows a relatively direct path between terminals. Excess wire which might otherwise be necessary to permit convenient attachment of the wires to the terminals is not needed here. The wires can be attached to the terminals after the connector have been placed in the close proximity evidenced by FIGS. 1 and 5. The spacing between individual connectors is determined more by the physical dimensions of the connectors themselves, then by the manner in which the entire tap-connector device is assembled. A consideration limiting the minimum spacing of connectors is the necessity for a secure seating of the wires in wire receiving portions 4. Sufficient lateral spacing of the wire portions downstream of the intermediate insertion points 58 and 64 to permit lateral insertion of these wires into wire receiving slots 4 of connector 50 must also be allowed. The distance "*d*" between the outer parts of wire receiving portions 4 in one of the individual terminals is identified in FIG. 5. It can be seen that the magnitude of the spacing between rearward faces of individual connectors 46, 48, and 50 is on the order of *d*. That is a convenient spacing for this device.

Figure 6:
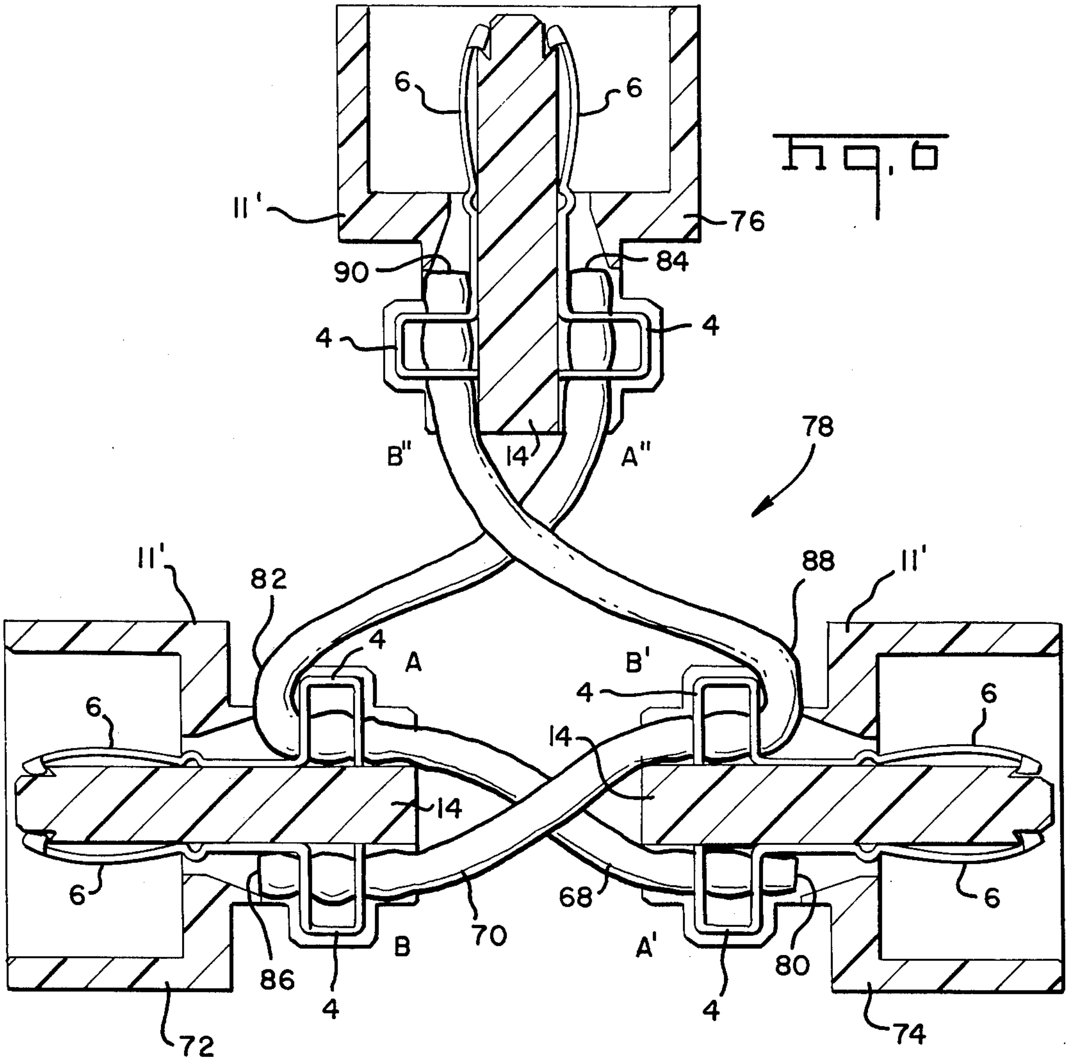
FIG. 6 is a sectional view of a tap connector employing three connectors of the same sex.

FIG. 6 is a sectional view similar to that of FIG. 5 showing a tap-connector configuration incorporating three individual connectors of the same sex. While three male connectors 72, 74, and 76 are shown here, the same wiring pattern results with three female connectors. Here wire 68 joins terminals in row A, A′ and A″. Wire 70 joins terminals in rows B, B′, and B″. When three identical connectors are employed, wires 68 and 70 must cross between each pair of connectors. The identical relative positioning of distinct rows A and B in identical connectors again results in this necessity for wires crossing. There is no appreciable difference in the proximity the three individual connectors in the configurations of FIG. 5 and 6.

FIG. 7 illustrates a configuration in which a female 96 and male connector 98 are located back-to-back and directly across from each other while a third connector, female connector 100, forms the base of the inverted T. There is no need for wires 92 and 94 to cross between connectors of the opposite sex. This configuration again shows the latticework pattern of the wires leading from separate connectors 96 and 98 to the third connector 100. In this one particular arrangement of connectors it would be possible to form a chain of three connectors using a slightly altered version of the method hereafter disclosed and still retain the ease of assembly and minimum spacing offered with this invention. A three connector chain would have both rows of wires running from one connector to a second and then both rows running from the second to the third.

Figure 8:
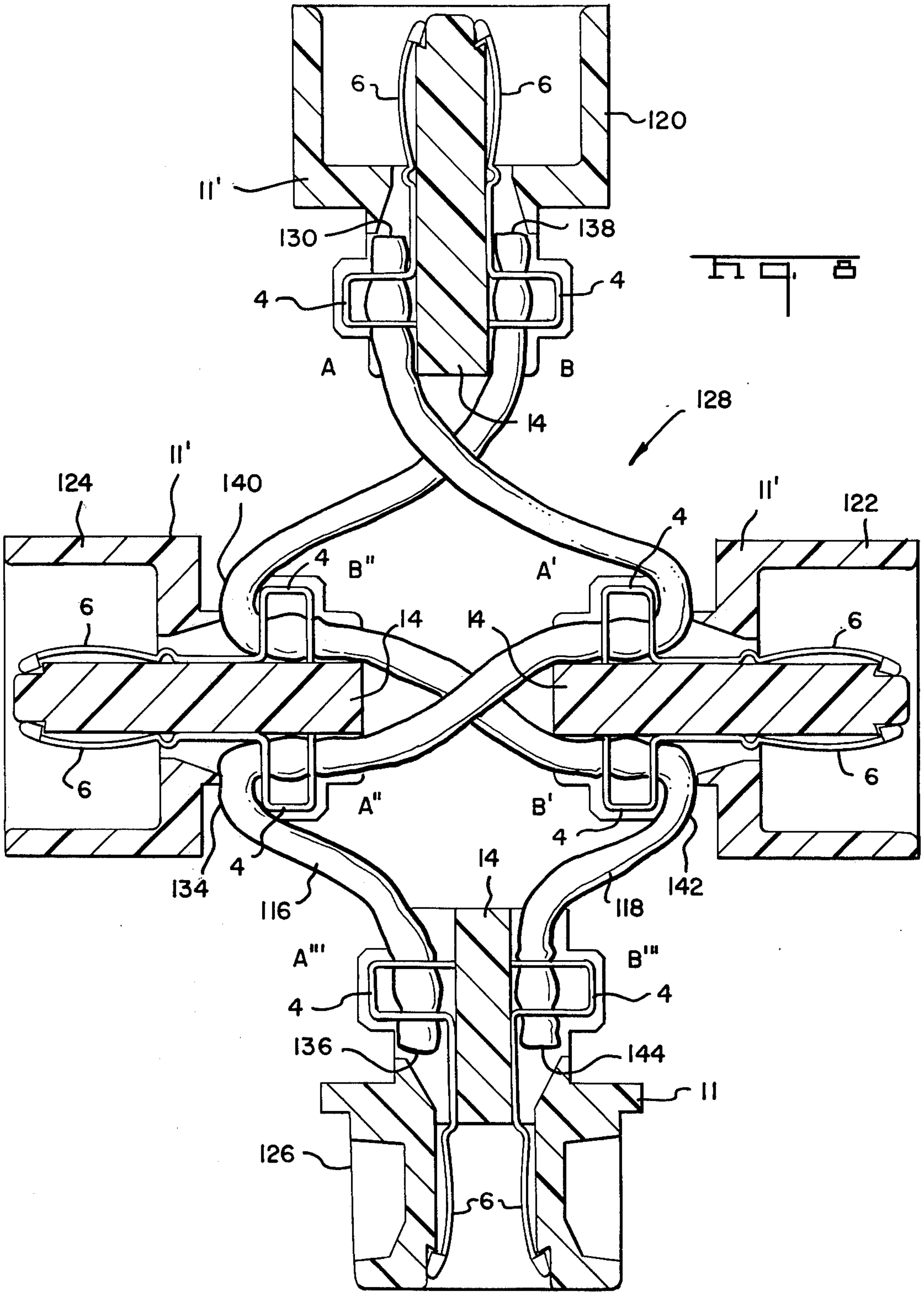
FIG. 8 is a sectional view of a tap-connector employing the same basic design but having four connectors.
Figure 7:
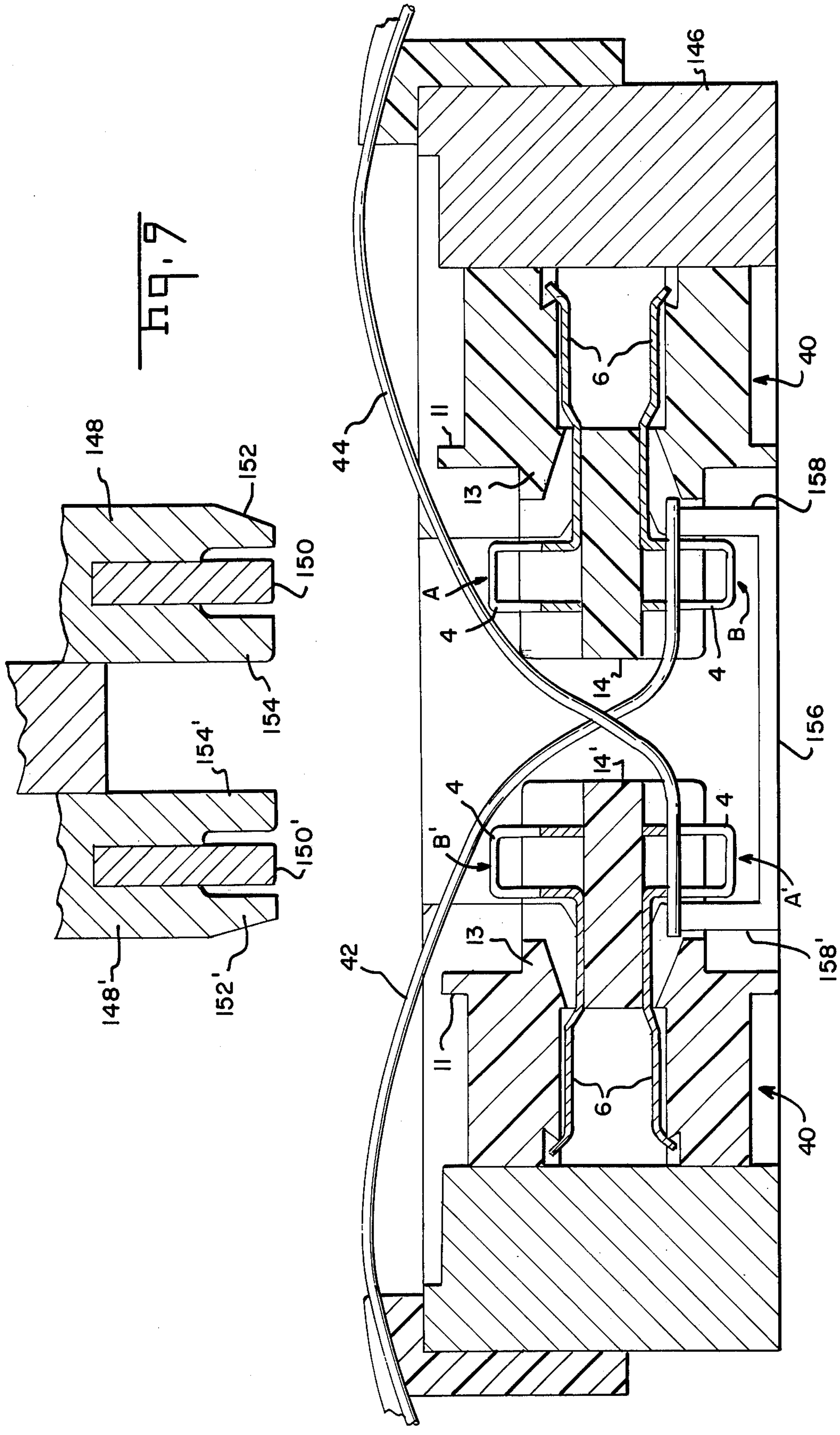

FIG. 8 shows a four-connector device constructed along the same lines as the three-connector devices already discussed. Connectors 120, 122, and 124 form a three-connector group which is virtually identical to that shown in FIG. 6. The only difference is that neither wire 116 or 118 has a dead end in the terminals of connectors 122 or 124. Instead wire 116 is inserted into a terminal in row A″ of connector 124 at a point 134 intermediate the ends of wire 116. Wire 118 has intermediate point 142 similarly located in row B′ of connector 122. A fourth connector 126 can then occupy a position analogous to that of connector 120 but on the opposite side. In this particular configuration three male and one female connectors are employed. The different lacing of the wires required as they travel from male connectors 122 and 124 to male connector 120 and when they alternatively travel to female connector 126 is graphically illustrated. It should be noted that the lacing pattern does not form a chain of four connectors but forms a latticework of four connectors. Although other configurations of three or four male and/or female connectors can be imagined, the embodiments shown in FIGS. 5–8 show the basic variations of lacing patterns that must be utilized in each case. Additional embodiments would not disclose anything other than obvious variations.

In all of the configurations in which this invention is envisioned, the individual connectors are grouped together about a central common axis. This axis would be perpendicular to the sections shown in FIGS. 5–8 and is parallel to all of the rows of terminals. In these configurations, all of the interconnecting wires are also grouped closely about the central common axis. The wires follow relatively direct paths between the closely grouped connectors. There is no necessity to compact any excess wire into a bundle so that the individual connectors might be positioned close together. The wires are contained wholly within the area adjacent to the rearward sides of the connectors and there is no tendency for the wires to obstruct the mating portions of the tap-connector device. In the discussion of the characteristics of the individual connectors in FIGS. 2 and 3, the plane of the lengthwise flange 11 or 11' was identified as the plane at which the rearward side 14 and mating side 12 of each connector meet. In FIGS. 5–8 it can be seen that the three or four planes defined by flanges 11 and/or 11']define a central area out of which the interconnecting wires do not travel.

This close spacing about the common axis results in a structural feature which, while not essential to the function of the device as a tap-connector, is nevertheless indicative of the size of the device. The multitude of short interconnecting wires utilized give this device a structural rigidity uncharacteristic of similar devices. The long parallel rows of short wires, of a suitable diameter to be used with these connectors, rigidly support the individual connectors relative to each other. The lengths of the wires relative to their diameters gives the wires themselves an ability to resist bending which would not present if somewhat longer chains of connectors were necessary. The inherent ability of this tap-connector to retain its T-shape could offer some utility in the implementation of these tap-connectors. In practice, however, it would probably be necessary to use suitable strain reliefs, possibly such as 39 shown in FIG. 1, to prevent the wires from being pulled out of the terminal slots 30. A suitably designed strain relief could be relied upon to also provide needed structural rigidity.

Figure 10:
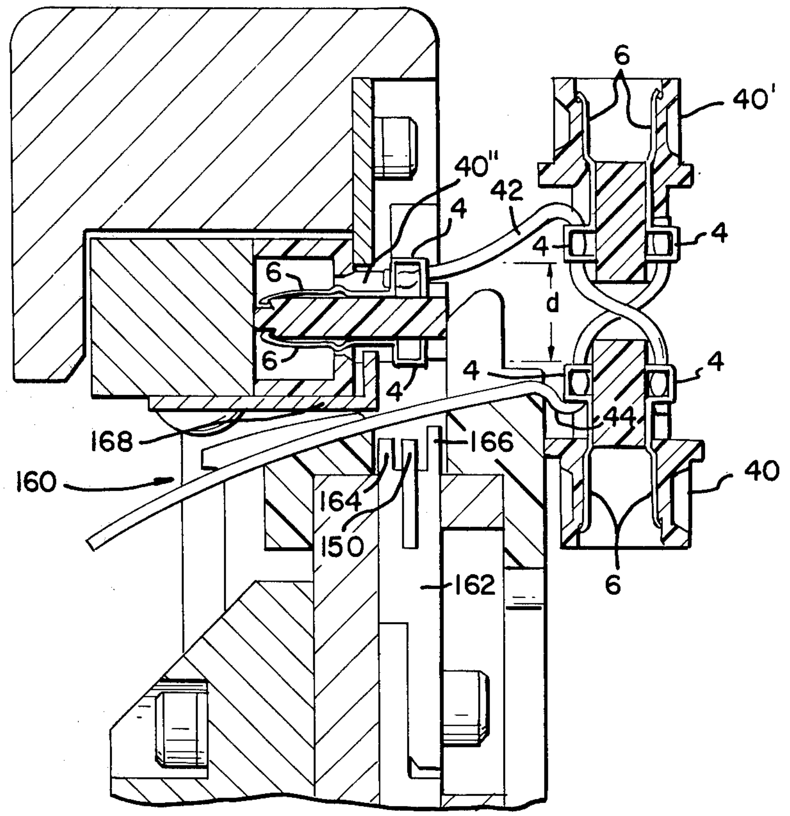
FIG. 10 is a sectional view showing a significant step for the proper connection of a third connector.

In order to attain the close proximity of separate connectors which constitutes one of the desirable aspects of this invention, suitable assembly techniques and operations must be employed. Key steps in fabricating a three-connector assembly are illustrated by FIGS. 9 and 10. FIG. 9 shows the apparatus employed to connect two connectors of the same sex, back-to-back, in the manner shown in FIG. 4. An apparatus employing the basic features used in this operation is fully disclosed and claimed in U.S. Pat. No. 3,866,292 Prior to this operation wires 42 and 44 have been inserted into terminals in rows B and A' of connectors 40 and 40' respectively. The connectors are then placed in back-to-back relation in a twin connector jig plate 146. The connectors are spaced far enough apart too permit wires 42 and 44 to cross and be aligned with terminals in rows A and B' as shown. Although connectors 40 and 40' might be placed close enough to barely permit passage of the wires between the connectors there is a certain distance at which the physical operation of passing the wires through to the other side will become inconvenient.

After the wires have been placed in alignment with the slots in rows A and B' tool blocks 148 and 148' are moved downward to insert the wires. Each tool block has individual punches 150 and 150' which upon full downward travel of the tool blocks act to firmly seat the wires in their respective slots. The outer tool ribs 152 and 152' are shaped so that wires 42 and 44 will not be sheared upon insertion of the wires into the respective slots. Upon completion of this step, the two connectors will be connected as shown in FIG. 4.

Additional of the third connector is illustrated by FIG. 10. The third connector 40' shown for the purposes of this illustration, is not the same sex as 40 or 40', and is shown mounted in a tool 160 suitable for attaching it in close proximity to connectors 40 and 40'. Wires, represented by wire 42, have already been inserted into one row of terminals in connector 40'' in the same manner in which wires 44 are about to be inserted. Tool 160 has a tool head or ram 162 which is of the same general construction as that shown in FIG. 9. The tool head 162 has two ribs 164 and 166 and a centrally located punch 150 which serves the same purpose here as in FIG. 9. A tool more completely disclosed and claimed in U.S. Pat. No. 3,816,897 incorporates the features required for this operation. The two-connector assembly, resulting from the operation of FIG. 9, is placed close to tool 160 with the wires 42 and 44 extending from one side and toward the third connector 40''. As before, the wire which is to be inserted into a particular terminal is placed perpendicular to the path of the tool head. In order to attain the proper orientation of connectors and wires, tool head 162 must move along a path parallel to the axis of the individual terminals in connectors 40 and 40''. This path is also perpendicular to the common axis of the resultant three-connector assembly and perpendicular to the rows of wire-receiving portions of the terminals in all three connectors. From its initial position shown here, tool head 162 moves upward along a path toward the lower row of wire-receiving terminals in connector 40''. Wires, represented here by wire 44 , which have been previously laced between the tool head 162 and connector 40'' are thus moved into position within appropriate terminals. In addition to inserting wires into terminals in the third connector, rib 164 on the tool head engages fixed shearing means 168 to sever the wires. Since tool head 162 is located along one side of tool 160, a connector 40'' can be positioned close to connectors 40 and 40' as desired.

FIG. 10 also illustrates a practical restriction on the minimum spacing of the individual connectors in the tap-connector device. Wires 42 and 44 must at some point be separated by at least the distance *d* in order to be moved into the slots. If the rearward sides of connectors 40 and 40' are closer than the distance *d* some slack must be permitted when the wires are inserted into connector 40''. Minimum spacing between one pair of connectors is therefore not wholly independent of the spacing which may be achieved with the third connector.

A simple and compact multi-conductor tap-connector together with the method in which it may be constructed has been presented in the foregoing description and in the accompanying drawings. Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A method of fabricating a multiconductor tap connector utilizing three individual multi-conductor connectors comprising a housing with terminals in corresponding terminal locations in which said three individual connectors are separately connected, said individual connectors each having distinct first and second parallel rows of contact terminals, each terminal location in any one connector being distinct and corresponding to the same distinct location in the other two connectors, said connectors having a rearward side, said terminals having conductor receiving portions located on said rearward side, said method comprising the steps of:

attaching separate conductors to the terminals in the first row of a first connector and attaching other separate conductors to the second row of terminals in a second connector, positioning said first and second connectors with their rearward faces closely adjacent each other and with their mating faces facing in opposite directions so that said rows of terminals are parallel and said terminals all extend in the same direction, lacing said separate conductors so that said conductors attached to said first row in said first connector are aligned with the terminals in the first row of said second connector and aligning said conductors attached to said second row of said second connector with said second row of said first connector, attaching said aligned conductors to the first row in said second connector and the second row in said first connector, said conductors being attached intermediate their ends, with free ends remaining unattached, positioning a third connector with its rearward face closely adjacent the rearward faces of and said first and second connectors and with the terminal rows in said third connector parallel to the rows in said first and second connectors, but with the terminals in said third connector perpendicular to the terminals said first and second connectors, and aligning and attaching said conductors to terminals on said third connector so that terminals in said third connector are attached to corresponding terminals in said first and second connectors, with conductors joining terminals in said first row of said third connector with terminals in said first row of said second connector, and conductors joining terminals in said second row of said third connector with said second row in said first connector, whereby a compact multi-conductor tap connector can be fabricated using three separate multi-conductor connectors.

2. A method as set forth in claim 1 wherein said conductor receiving portions comprise slots adjacent to one end of said terminals, said slots extending perpendicular to said rows and said slots in said first row facing in the opposite direction from said slots in said terminals in said second row, and wherein said conductors are attached to said terminals by the movement of an insertion punch towards and away from said rows, said conductors being pushed into said slots by said punch so that the edges of said slots establish contact with said conductors.

3. A method as set forth in claim 1 wherein said separate conductors comprise wires.

4. A method as set forth in claim 1, wherein the step of positioning said first and second connectors with their rearward faces adjacent comprises the step of so positioning said first and second connectors that said first row in said first connector is offset relative to said first row in said second row and said second row in said first connector is similarly offset relative to said second row in said second connector so that conductors joining corresponding terminals in both of said first rows must cross wires joining corresponding terminals in both said second rows.

5. A method a set forth in claim 1 wherein said connectors are positioned so that corresponding terminals lie in common planes.

6. A method as set forth in claim 5 wherein a conductor joining said corresponding terminals lie in common planes.

7. A method as set forth in claim 2 wherein conductors are simultaneously attached to all of the terminals in any one row.

8. A method as set forth in claim 2 wherein said punch moves parallel to said terminals in said first and second connectors during insertion of said wires into terminals in said third connector.

* * * * *